United States Patent
Yamaguchi et al.

(10) Patent No.: US 8,161,855 B2
(45) Date of Patent: Apr. 24, 2012

(54) CUTTING MACHINE AND METHOD FOR CONTROLLING HEAD MOVING DEVICE OF SAME

(75) Inventors: Yoshihiro Yamaguchi, Kaga (JP); Takahiro Iriyama, Kaga (JP); Satoshi Ohnishi, Kaga (JP)

(73) Assignee: Komatsu Industries Corporation, Tokyo (JP)

( * ) Notice: Subject to any disclaimer, the term of this patent is extended or adjusted under 35 U.S.C. 154(b) by 862 days.

(21) Appl. No.: 12/225,186

(22) PCT Filed: Feb. 14, 2007

(86) PCT No.: PCT/JP2007/052601
§ 371 (c)(1),
(2), (4) Date: Sep. 16, 2008

(87) PCT Pub. No.: WO2007/111053
PCT Pub. Date: Oct. 4, 2007

(65) Prior Publication Data
US 2009/0183612 A1 Jul. 23, 2009

(30) Foreign Application Priority Data
Mar. 29, 2006 (JP) .................... 2006-091977

(51) Int. Cl.
*B26D 5/00* (2006.01)
*B23K 7/10* (2006.01)
*B23K 10/00* (2006.01)
*B23K 26/08* (2006.01)
(52) U.S. Cl. ............... 83/76; 219/121.39; 219/121.67; 219/121.83
(58) Field of Classification Search .. 219/121.18–121.2, 219/121.39–121.42, 121.67–121.72, 121.83; 83/72, 522.11, 522.12, 76; 408/16
See application file for complete search history.

(56) References Cited

U.S. PATENT DOCUMENTS

| | | | |
|---|---|---|---|
| 5,803,943 A * | 9/1998 | Parsons | 65/269 |
| 6,856,843 B1 * | 2/2005 | Herman, Jr. | 700/95 |
| 2004/0194428 A1 * | 10/2004 | Close et al. | 53/381.2 |
| 2006/0230964 A1 * | 10/2006 | Watanabe et al. | 101/454 |
| 2008/0066596 A1 * | 3/2008 | Yamaguchi et al. | 83/34 |
| 2010/0147166 A1 * | 6/2010 | Hirota et al. | 101/23 |

FOREIGN PATENT DOCUMENTS

| | | |
|---|---|---|
| JP | U06-33210 | 4/1994 |
| JP | 8-288356 | 11/1996 |
| WO | WO 2005/113183 A1 | 12/2005 |

OTHER PUBLICATIONS

International Search Report mailed on May 22, 2007 for the corresponding International patent application No. PCT/JP2007/052601 (English translation enclosed).

* cited by examiner

*Primary Examiner* — Samuel M Heinrich
(74) *Attorney, Agent, or Firm* — Posz Law Group, PLC

(57) ABSTRACT

A cutting machine secures safety of a worker during movement of a head without lowering production efficiency. When moving a cutting head without cutting material to be cut upon a table, a moving truck and the cutting head are moved at a higher speed as compared with when cutting the material to be cut. If, when the moving truck and the cutting head are moving at high speed, a worker who is present upon the table intercepts either of light beams which are located in front of and behind a horizontal beam, then this movement speed is decelerated to a safe low speed, but the task of cutting the material is not interrupted. Subsequently, when the worker approaches the horizontal beam closer, and contacts a wire or a bar in the vicinity of the horizontal beam, movement of the moving truck and the cutting head is forcibly stopped.

16 Claims, 8 Drawing Sheets

CUTTING MACHINE AND METHOD FOR CONTROLLING HEAD MOVING DEVICE OF SAME

CROSS REFERENCE TO RELATED APPLICATIONS

This application is a U.S. national stage application of PCT/JP2007/052601 filed on Feb. 14, 2007, and claims priority to, and incorporates by reference, Japanese Patent Application No. 2006-091977, filed on Mar. 29, 2006.

TECHNICAL FIELD

The present invention relates to a cutting machine, such as a plasma, laser, or gas cutting machine or a combination thereof or the like, which cuts a material to be processed which is mounted upon a table by using a cutting head which moves, and to a method for controlling a head moving device of the same.

BACKGROUND ART

In order to enhance the throughput of a cutting machine, it is disclosed in Patent Document #1, when moving a cutting head without cutting the material to be processed, to control the head to move at a higher speed than the speed at which it is moved while the material to be processed is being cut, and moreover to control the component of its speed of movement in the direction of the short side of the table to be higher, than the component of its speed of movement in the lengthwise direction. Furthermore, in order to ensure security, it is also disclosed in Patent Document #1, when the cutting head is moving at high speed, to forcibly stop this high speed movement of the cutting head when it is detected by a sensor that a worker or some other obstruction is present in the vicinity of the cutting head.

Patent Document #1: International Publication WO 2005/113183.

SUMMARY

With a large sized cutting machine, while a cutting process is being performed by the cutting head upon some item of material to be processed at one region upon the table, it is not unusual for a worker to mount onto some other region upon the table, in order to perform some task such as putting on or taking away some other item of material to be processed or the like. In the prior art, in this type of case, if the distance between the cutting head or a head moving device such as a carriage, an arm, a moving truck or the like for moving the cutting head, and the worker, becomes extremely close, then the movement of the head moving device, in other words the movement of the cutting head, is forcibly stopped as an emergency, so that the safety of the worker is ensured.

However, actually, it is very unusual for a worker to approach the cutting head or the head moving device negligently, and if the cutting task is interrupted each time this happens (which is undesirable), then much more time than necessary is wasted in resuming the cutting task, so that the production efficiency is deteriorated.

Moreover, in order to enhance the production efficiency, there is a demand to increase the movement speed of the cutting head by a yet further level. However, if the movement speed is increased, since it is necessary to ensure a correspondingly great stopping distance, it is accordingly necessary to set the detection area of the sensor wider. Due to this, if anything, there is a fear that the frequency that interruption of the cutting task as described above will increase. In addition to this, the more the movement speed is increased, the greater becomes the dynamic burden which is imposed upon the drive system of the head moving device when performing an emergency stop.

Accordingly, the object of the present invention is to improve the control of a head movement mechanism of a cutting machine, and to contribute both to ensuring safety and also to enhancement of production efficiency.

According to a first aspect of the present invention, there is provided a cutting machine, comprising: a table upon which a material to be processed is mounted; a cutting head which cuts said material to be processed upon said table; a head moving device which supports said cutting head, which moves in the lengthwise direction and the widthwise direction of said table, and which moves said cutting head with respect to said material to be processed upon said table; a control device which controls said head moving device; and a warning detector which detects whether any obstruction is present in a predetermined warning region which is arranged so as to be separated by a predetermined distance range from a portion of said head moving device which is present over said table, and from said cutting head; wherein said control device comprises: a basic control means which, when moving said cutting head while cutting said material to be processed, controls the movement speed of said cutting head to a predetermined cutting movement speed, and, when moving said cutting head while not cutting said material to be processed, controls the movement speed of said cutting head to a predetermined skipping movement speed; and a warning movement control means which, when moving said cutting head while not cutting said material to be processed, in response to said warning detector, reduces said skipping movement speed while not stopping the movement of said cutting head.

According to this cutting machine, when a worker is riding upon the table and is performing some task, if the head moving device or the head which is mounted thereto becomes close to the worker, when this head moving device or cutting head is separated by a distance range of some predetermined level from the head moving device or the cutting head, the skipping movement speed is reduced in the state where the cutting task continues to be performed in a normal manner. Due to this, it is possible to enhance the security for the worker, without interrupting the cutting task.

Furthermore, with this cutting machine, consequent upon it being possible to reduce the skipping movement speed as described above, it becomes possible to set the skipping movement speed at normal times higher than in the prior art. If the skipping movement speed is thus set to be higher, the production efficiency is enhanced in equal measure.

In a preferred embodiment, the cutting machine further comprises an emergency detector which detects whether any obstruction is present in a predetermined emergency region which is arranged so as to be closer to the portion of said head moving device which is present over said table, and to said cutting head, than said warning region. And said control device further comprises an emergency stop control means which forcibly stops the movement of said cutting head in response to said emergency detector.

According to this cutting machine, when as described above the head moving device and the worker have approached one another to within some distance range, after the skipping movement speed has been decreased, if the gap between the worker and the head moving device reduces further, the head moving device is stopped upon an emergency basis. Due to this two stage movement control in which decelerating is performed at a first stage and stopping is performed at a second stage, it is possible reliably to ensure the safety of the worker. Moreover, during emergency stopping, since the movement speed is already reduced, the stopping distance becomes extremely short (for example it may be substantially zero, so that the security is enhanced. Moreover, due to the deceleration in the first stage, the frequency of interruption of the cutting work due to the occurrence of emergency stoppage is decreased, so that the productivity is enhanced. Furthermore, by reducing the frequency of emergency stoppages, the stress which is imposed upon the head drive device is also reduced, so that its life becomes longer.

In another preferred embodiment, said warning detector comprises a non contact type sensor, and detects said obstruction without contacting said obstruction. Moreover, said emergency detector comprises a contact type sensor, and detects said obstruction by contacting said obstruction. Due to this, no interference is imparted to the task of the worker at this stage at which the danger due to approaching is low, while on the other hand, if the danger becomes high, it is possible to make the worker aware of this fact.

Furthermore, in another preferred embodiment, the gap between said warning region and said emergency region is set to a distance greater than or equal to the stopping distance which is required to stop said cutting head when said cutting head is moving at the skipping movement speed without yet having decelerated. Due to this, it is possible to stop the head moving device reliably, with no fear that it may collide with the worker.

Moreover, in yet another preferred embodiment, said head moving device comprises: a horizontal beam which extends along said widthwise direction over said table and straddles over said table; and a carriage which is mounted to said horizontal beam, which movies upon said horizontal beam in said widthwise direction, and which supports said cutting head. Furthermore, said warning detector comprises: a horizontal beam forward warning detector which detects whether an obstruction is present in a horizontal beam forward warning region which is arranged as separated from said horizontal beam by a predetermined distance range forward from said horizontal beam in said lengthwise direction, and which moreover extends along almost the total length of said horizontal beam in said widthwise direction; a horizontal beam rearward warning detector which detects whether an obstruction is present in a horizontal beam rearward warning region which is arranged as separated from said horizontal beam by a predetermined distance range rearward from said horizontal beam in said lengthwise direction, and which moreover extends along almost the total length of said horizontal beam in said widthwise direction. And said emergency detector comprises: a horizontal beam forward emergency detector which detects whether an obstruction is present in a horizontal beam forward emergency region which is arranged forward from said horizontal beam in said lengthwise direction and closer to said horizontal beam than said horizontal beam forward warning region, and which moreover extends along almost the total length of said horizontal beam in said widthwise direction; and a horizontal beam rearward emergency detector which detects whether an obstruction is present in a horizontal beam rearward emergency region which is arranged rearward from said horizontal beam in said lengthwise direction and closer to said horizontal beam than said horizontal beam rearward warning region, and which moreover extends along almost the total length of said horizontal beam in said widthwise direction.

According to this construction, if a worker is present upon the table, the safety of this worker is ensured when the horizontal beam of the head moving device, which straddles the table, moves in the lengthwise direction of the table.

Furthermore, in still another preferred embodiment, said head moving device comprises a truck which moves outside said table in said lengthwise direction, and said emergency detector comprises: a truck forward emergency detector which detects whether an obstruction is present in a truck forward emergency region which is arranged forward from said truck in said lengthwise direction, and which moreover extends along almost the total width of said truck in said widthwise direction; and a truck rearward emergency detector which detects whether an obstruction is present in a truck rearward emergency region which is arranged rearward from said truck in said lengthwise direction, and which moreover extends along almost the total width of said truck in said widthwise direction.

According to this structure, if a worker is present outside the table, the safety of this worker is ensured when the moving truck of the head moving device moves in the lengthwise direction of the table.

And, in even another preferred embodiment, said truck forward emergency region and said truck rearward emergency region are arranged, to forward and rearward from said truck in said lengthwise direction respectively, as separated from by gaps greater than or equal to said stopping distance. Due to this, it is possible to stop the moving truck reliably, with no fear that it may collide with the worker.

Furthermore, in still yet another preferred embodiment, said head moving device (25) comprises a portion for a worker to ride upon; and said control device (80) comprises a riding safety control means which decides whether or not a worker is riding upon said head moving device, and, if it has decided that a worker is riding upon said head moving device, limits said skipping movement speed to a lower speed than when no worker is riding upon said head moving device. Since, due to this, when a worker is riding upon the head moving device, the head moving device moves at a low speed, accordingly the safety of the worker is ensured.

And, according to a second aspect of the present invention, for a cutting machine comprising: a table upon which a material to be processed is mounted; a cutting head which cuts said material to be processed upon said table; a head moving device which supports said cutting head, which moves in the lengthwise direction and the widthwise direction of said table, and which moves said cutting head with respect to said material to be processed upon said table; and a control device which controls said head moving device; there is provided a method for controlling said head moving device, characterized by comprising: a step of deciding whether or not any obstruction is present in a predetermined warning region which is arranged so as to be separated by just a predetermined distance range from a portion of said head moving device (25) which is present over said table, and from said cutting head; a step of, when moving said cutting head while cutting said material to be processed, controlling the movement speed of said cutting head to a predetermined cutting movement speed; a step of, when moving said cutting head while not cutting said material to be processed, controlling the movement speed of said cutting head to a predetermined skipping movement speed; and a step of, when moving said cutting head while not cutting said material to be processed, if it is detected that an obstruction is present in said warning region, reducing said skipping movement speed while continuing the movement of said cutting head.

In a preferred embodiment, this method of control further includes a step of deciding whether or not any obstruction is present in a predetermined emergency region which is arranged so as to be closer to the portion of said head moving device (25) which is present over said table, and to said cutting head (24), than said warning region; and a step of, if it is detected that an obstruction is present in said emergency region, forcibly stopping the movement of said cutting head. According to this method of control, the frequency with which interruption of a cutting task takes place due to emergency stoppage is decreased, and moreover the security of the worker is enhanced.

PREFERRED EMBODIMENTS FOR IMPLEMENTATION OF THE INVENTION

Figure 1:
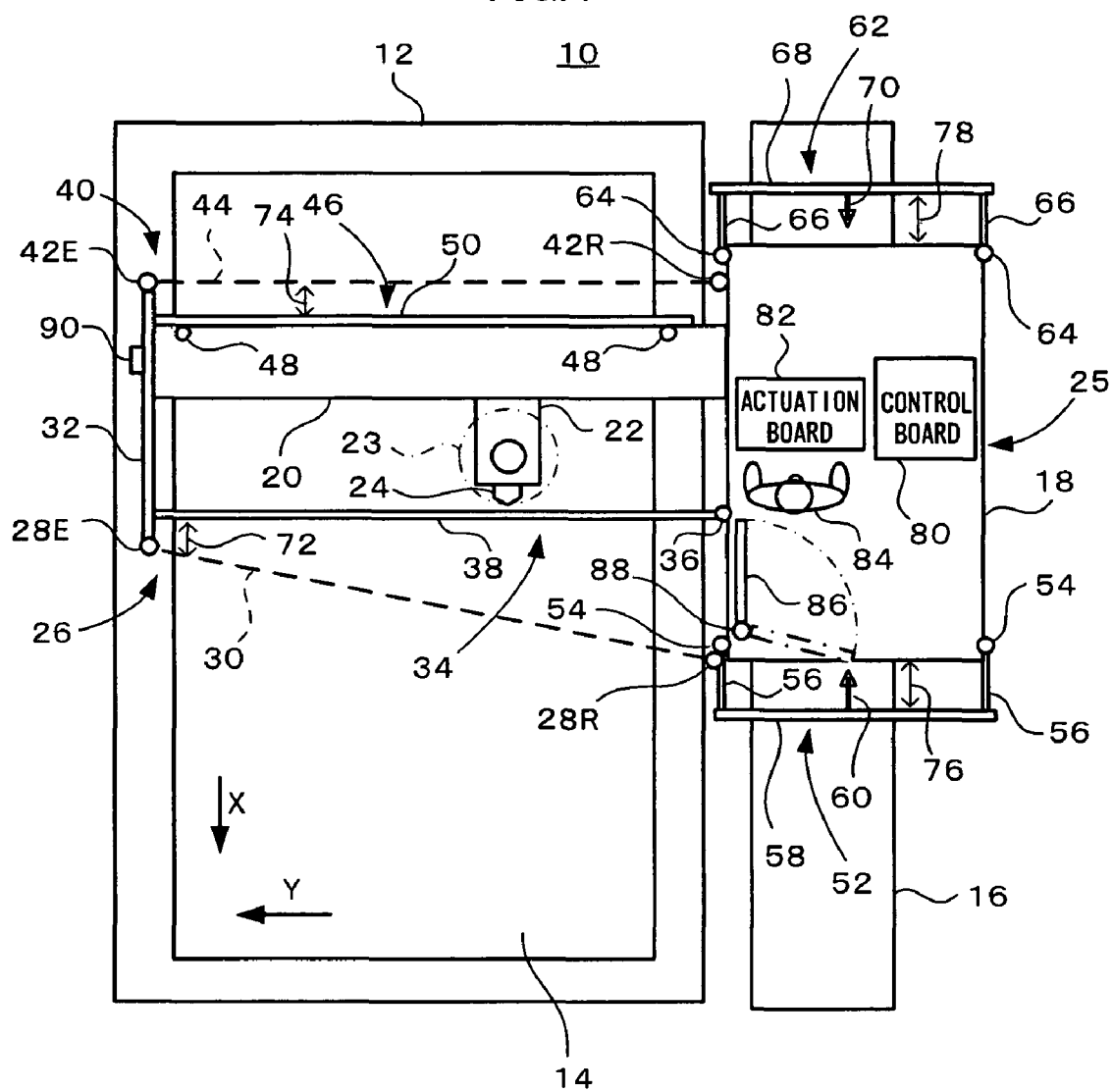
FIG. 1 is a plan view of a cutting machine according to an embodiment of the present invention.

FIG. 1 is a plan view of a cutting machine according to an embodiment of the present invention.

As shown in FIG. 1, this cutting machine 10 comprises a box shaped table 12 which is installed upon a floor. The upper surface of this table 12 is rectangular, and a rectangular working region 14 is provided in its center, and a material to be cut (typically a steel plate) (not shown in the figure) is mounted upon this working region 14. An X-Y-Z orthogonal coordinate system is defined for numerical calculation processing in order to control the cutting position of the material to be cut. The direction of the X axis of this X-Y-Z orthogonal coordinate system is the lengthwise direction of the table 12 (or of the working region 14) (which is the vertical direction in the figure); the direction of its Y axis is the widthwise direction of the table 12 (or of the working region 14) (which is the horizontal direction in the figure); and the direction of its Z axis is the direction perpendicular to the upper surface of the table 12 (or to the plane of the working region 14) (which is the depth direction in the figure).

A base 16 which extends along the lengthwise direction of the table 12 is installed upon the floor in the neighborhood of the outer side of the table 12. A moving truck 18 is installed upon this base 16, and this can move in the X axis direction along the base 16. A horizontal beam 20 is fixed to the moving truck 18, and this extends above the table 12 linearly along the Y axis direction, so as to straddle over the table 12 (or the working region 14). When the moving truck 18 moves in the X axis direction, the horizontal beam 20 also moves in the X axis direction together therewith. In the example shown in the figure, this horizontal beam 20 is a cantilevered beam only one end of which is supported upon the moving truck 18, but this is only cited as one possible example; it would also be acceptable for both ends of this beam to be supported.

A carriage 22 is mounted upon the horizontal beam 20, and this can move along the horizontal beam 20 in the Y axis direction. A cutting head 24 is mounted upon the carriage 22. The carriage 22 does not only move the cutting head 24 in the Y axis direction; it also can move it in the Z axis direction. Moreover, a head direction variation mechanism (not shown in the figures) is present between the carriage 22 and the cutting head 24, for changing the direction of the cutting head 24 (for example, by tilting or rotating it) when performing beveling processing. The region 23 near the carriage 22 shown by the single dotted broken line indicates a spatial region (hereinafter termed the "head occupation region") in which, by the operation of this head direction variation mechanism, the set of the cutting head 24 and the above described head direction variation mechanism can move and rotate with respect to the carriage 22. The cutting head 24 is drive controlled by a control board 80 which will be described hereinafter. It should be understood that, for the cutting head 24, it is possible to employ various types of device, for example, a plasma torch, a laser torch, a gas burner, a combination of several different types of the above torches and burners, or the like. Although, in this embodiment, only one cutting head 24 is provided, it would also be acceptable to provide a plurality of cutting heads.

The above described moving truck 18, horizontal beam 20, and carriage 22 constitute a head moving device 25 for moving the cutting head 24 in the X, Y, and Z axis directions. This head moving device 25 is able to sent the cutting head 24 to any position within the entire area of the working region 14. The highest speed at which this head moving device 25 can move the cutting head 24 in the Y axis direction (in other words, the highest speed at which the carriage 22 can move) is greater than the highest speed at which it can move it in the X axis direction (in other words, the highest speed at which the moving truck 18 can move). This head moving device 25 is drive controlled by the control board 80 which will be described hereinafter.

The head moving device 25 comprises detectors of a plurality of types for detecting that a worker or some other obstruction is present in the vicinity of the head moving device, to wit: a horizontal beam forward warning detector 26, a horizontal beam forward emergency detector 34, a horizontal beam rearward warning detector 40, a horizontal beam rearward emergency detector 46, a truck forward emergency detector 52, and a truck rearward emergency detector 62. The output signals of these detectors 26, 34, 40, 46, 52, and 62 are inputted to the control board 80, and the control board 80 is adapted to control the operation of the head moving device 25 based upon those input signals.

Here, the two so called "warning detectors" 26 and 40 are devices for detecting whether or not an obstruction such as a workman or the like is present in a predetermined spatial region (hereinafter termed the "warning region") upon the table 12 which is separated by just a predetermined distance range from the horizontal beam 20, which is the portion of the head moving device 25 located at the front of the table 12. Among these, the horizontal beam forward warning detector 26 is a device for detecting whether or not any obstruction is present in a predetermined spatial region (which is a region corresponding to the reference numeral 30 in FIG. 1, and hereinafter will be termed the "horizontal beam forward warning region") which is separated by just the predetermined distance range forwards from the horizontal beam 20 in the X axis direction (which, in other words, is the direction in the lengthwise direction of the table 12 from the horizontal beam 20 on its side where the cutting head 24 is present, i.e. the downwards direction in FIG. 1). Moreover, the horizontal beam rearward warning detector 40 is a device for detecting whether or not any obstruction is present in a predetermined spatial region which is separated by just the predetermined distance range rearwards from the horizontal beam 20 in the X axis direction (the upwards direction in FIG. 1) (which is a region corresponding to the reference numeral 44 in FIG. 1, and hereinafter will be termed the "horizontal beam rearward warning region").

On the other hand, the four so called "emergency detectors" 34, 46, 52, and 62 described above are devices for detecting whether or not an obstruction such as a workman or the like is present in a predetermined spatial region (hereinafter termed the "emergency region") which is extremely close to the head moving device 25 or the cutting head 24. Among these, the horizontal beam forward emergency detector 34 is a device for detecting whether or not an obstruction is present in a predetermined spatial region close to the horizontal beam 20 in the forward X axis direction (which is a region corresponding to the reference number 38 in FIG. 1, and is hereinafter termed the "horizontal beam forward emergency region"). Furthermore, the horizontal beam rearward emergency detector 46 is a device for detecting whether or not an obstruction is present in a predetermined spatial region close to the horizontal beam 20 in the rearward X axis direction (which is a region corresponding to the reference number 50 in FIG. 1, and is hereinafter termed the "horizontal beam rearward emergency region"). Moreover, the truck forward emergency detector 52 is a device for detecting whether or not an obstruction is present in a predetermined spatial region close to the moving truck 18 in the forward X axis direction (which is a region corresponding to the reference number 58 in FIG. 1, and is hereinafter termed the "truck forward emergency region"). Finally, the truck rearward emergency detector 62 is a device for detecting whether or not an obstruction is present in a predetermined spatial region close to the moving truck 18 in the rearward X axis direction (which is a region corresponding to the reference number 68 in FIG. 1, and is hereinafter termed the "truck rearward emergency region").

Here, in the case of both of the above described horizontal beam forward warning region and rearward warning region (the regions which correspond to the reference numbers 30 and 44), although, even if an obstruction is present therein, the danger (i.e. the danger of a collision with the obstruction taking place) is not so high as to make it necessary to stop the moving operation of the head moving device 25 (in other words, the moving operation of the cutting head 24), nevertheless, according to requirements, they are regions in which a sufficiently high danger exists to make it necessary to issue a warning to the effect that this moving operation may be immediately stopped at any moment. By contrast, the horizontal beam forward emergency region and rearward emergency region (the regions which correspond to the reference numbers 38 and 50) and also the truck forward emergency region and rearward emergency region (the regions which correspond to the reference numbers 58 and 68) are all of them regions for which, if an obstruction is present therein, a sufficiently high danger (i.e. a danger of a collision with the obstruction taking place) exists to make it necessary immediately to stop the moving operation of the head moving device 25 (in other words, the moving operation of the cutting head 24).

Accordingly, by comparison with the above described horizontal beam forward and rearward warning regions, the horizontal beam forward and rearward emergency regions are arranged at closer locations to the horizontal beam 20. And the gap 72 between the horizontal beam forward emergency region (the region which corresponds to the reference number 30) and the horizontal beam forward warning region (the region which corresponds to the reference number 38) is set to a distance which is equal to or longer than the stopping distance which the head moving device 25 requires for perfectly coming to a halt from the state in which it is moving at its highest speed in the X axis direction (i.e. in the lengthwise direction of the table 12). In a similar manner, the gap 74 between the horizontal beam rearward emergency region (the region which corresponds to the reference number 50) and the horizontal beam rearward warning region (the region which corresponds to the reference number 44) is also set to a distance which is equal to or longer than the above described stopping distance. Accordingly, if an obstruction such as a worker or the like has approached the horizontal beam 20, this obstruction is first detected by the horizontal beam forward warning detector 26 or rearward warning detector 40, and thereafter comes to be detected by the horizontal beam forward emergency detector 34 or the horizontal beam rearward emergency detector 46, only after its distance from the horizontal beam 20 has closed up by just the above described gap 72 or 74.

The output signals of the above described warning detectors 26 and 40 and emergency detectors 34, 46, 52, and 62 are inputted to the control board 80. The output signals of the warning detectors 26 and 40 are used by the control board 80 for reducing the movement speed of the head moving device 25 (i.e. the movement speed of the cutting head 24). On the other hand, the output signals of the emergency detectors 34, 46, 52, and 62 are used for stopping the movement operation of the head moving device 25 (i.e. the movement operation of the cutting head 24) on an emergency basis. Accordingly, if an obstruction such as a worker or the like has approached the horizontal beam 20, first, when this obstruction is detected by the horizontal beam forward warning detector 26 or rearward warning detector 40, the movement speed of the head moving device 25 is reduced, and thereafter, when this obstruction is detected by the horizontal beam forward emergency detector 34 or the horizontal beam rearward emergency detector 46, the movement operation of the head moving device 25 comes to be stopped as an emergency.

The concrete structures of the above described warning detectors 26 and 40 and emergency detectors 34, 46, 52, and 62 will now be described.

That is to say, all of these detectors 26, 40, 34, 46, 52, and 62 may be made using sensors of the non contact type which can detect the existence of an obstruction without contact therewith, or may be made using sensors of the contact type which detect the existence of an obstruction by contacting therewith. However, in this embodiment, non contact type sensors are used for the warning detectors 26 and 40. In other words, the horizontal beam forward warning detector 26 is an optical sensor which is made up from a set of a light emitting element 28E which emits a light beam 30, and a light reception element 28R which receives this light beam 30 from the light emitting element 28E and converts it into an electrical signal. The light reception element 28R is fixed to the side wall of the front portion of the moving truck 18. And the light emitting element 28E is fixed to the front end portion of an arm 32 which is fixed to the end portion of the horizontal beam 20 on the opposite side thereof from its side at the moving truck 18, and emits the light beam 30 towards the light reception element 28R upon the moving truck 18. The spatial region from the light emitting element 28E along the light beam 30 to the light reception element 28R corresponds to the above described horizontal beam forward warning region. Furthermore, the horizontal beam rearward warning detector 40 is an optical sensor which is made up from a set of a light emitting element 42E which emits a light beam 44, and a light reception element 42R which receives this light beam 44 from the light emitting element 42E and converts it into an electrical signal. The light reception element 42R is fixed to the side wall of the rear portion of the moving truck 18. And the light emitting element 42E is fixed to the rear end portion of the arm 32 which is fixed to the end portion of the horizontal beam 20, and emits the light beam 44 towards the light reception element 42R upon the moving truck 18. The spatial region from the light emitting element 42E along the light beam 44 to the light reception element 42R corresponds to the above described horizontal beam rearward warning region.

Accordingly, when a worker who is performing a task upon the table 12 enters the horizontal beam forward or rearward warning region, it is possible to detect the presence of this worker, since the light beam 30 or 44 becomes interrupted and the output signal level of the light reception element 28R or 42R changes. There is the advantageous aspect that, by using non contact type sensors for the warning detectors 26 and 30 in this manner, during detection, no obstruction or interference hampers the task which the worker is doing upon the table 12.

On the other hand, in this embodiment, contact type sensors are used for the emergency detectors 34, 46, 52, and 62. In other words, for the horizontal beam forward emergency detector 34, there is used a wire sensor which is adapted to perform detection by the obstruction coming into contact with a wire 38. This wire 38 is stretched between a position which is just a predetermined distance rearward of the above described fixing position of the light emitting element 28E at the front portion of the above described arm 32, and a position which is just a predetermined distance rearward of the above described fixing position of the light reception element 28R at the side wall of the front portion of the moving truck 18. The position of the wire 38 in the X axis direction is slightly forward of the head occupation region 23. A limit switch 36 which emits an electrical signal is coupled to the end portion of the wire 38 at its end on the truck 18. And, when an obstruction comes into contact with the wire 38 and deflects it, the wire 38 pulls upon the limit switch 36, and it is arranged for the limit switch 36 to be turned ON or turned OFF thereby. The spatial region through which the wire 38 passes corresponds to the above described horizontal beam forward emergency region. Moreover, for the horizontal beam rearward emergency detector 46, a bar sensor is used which is adapted to detect an obstruction coming into contact with a bar 50. The bar 50 is fitted to the rear surface of the horizontal beam 20 in such a state that it can approach thereto and move back away therefrom, and it extends over the entire length of the horizontal beam 20 in the Y axis direction. A plurality of limit switches 48, 48 which generate electrical signals are fixed to positions upon the rear surface of the horizontal beam 20 behind the bar 50, and are coupled to the bar 50. And, when an obstruction comes into contact with the bar 50 and the bar 50 is pressed towards the horizontal beam 20, the bar 50 presses upon the limit switches 48, 48, and it is arranged for the limit switches 48, 48 to be turned ON or turned OFF thereby. The spatial region through which the bar 50 passes corresponds to the above described horizontal beam rearward emergency region.

Furthermore, for the truck forward emergency detector 52, a bar sensor with attached damper is used which is adapted to detect an obstruction coming into contact with a bar 58 with attached damper. The bar 58 is fitted to the front end portion of the moving truck 18. A plurality of limit switches 54, 54 which generate electrical signals are fixed to the moving truck 18, and these limit switches 54, 54 are coupled to dampers 56, 56. The bar 58 extends over the entire width of the moving truck 18 in the Y axis direction, and is normally positioned as separated forward from the front surface of the moving truck 18 by just a predetermined gap 76. This gap 76 is set to a distance which is equal to or longer than the stopping distance required by the head moving device 25 for coming to a perfect halt from the state of moving at its highest possible speed in the X axis direction (the lengthwise direction of the table 12). And, when an obstruction comes into contact with the bar 58 so as to press it in the direction of the moving truck 18, the limit switches 54, 54 are turned ON or turned OFF thereby. If the pressing of the bar 58 continues, due to the operation of the dampers 56, 56, it can move backwards until it comes into contact with the moving truck 18, as shown by the arrow sign 60. The spatial region through which the bar 58 passes corresponds to the above described truck forward emergency region.

And the truck rearward emergency detector 62 as well is a similar bar sensor with attached damper, using a bar 68. This bar 68, as well, extends over the entire width of the moving truck 18 in the Y axis direction, and is normally positioned as separated rearward from the rear surface of the moving truck 18 by just a predetermined gap 78. This gap 78 is set to a distance which is equal to or longer than the above described stopping distance. When an obstruction comes into contact with the bar 68 so as to press it in the direction of the moving truck 18, limit switches 64, 64 are turned ON or turned OFF. If the pressing of the bar 68 continues, due to the operation of the dampers 66, 66, it can move backwards until it comes into contact with the moving truck 18, as shown by the arrow sign 70. The spatial region through which the bar 68 passes corresponds to the above described truck rearward emergency region.

There is the advantageous aspect that, by using contact type sensors for the emergency detectors 34, 46, 52, and 62 in this manner, it is possible to notify the worker of the danger on an emergency basis.

Furthermore, the moving truck 18 is adapted so that a worker 83 can ride on top of it. In the zone upon the moving truck 18 in which the worker 84 can ride, there are mounted the control board 80 for drive controlling the head moving device 25 and the cutting head 24, and also an actuation board 82 for, upon actuation by the worker 84, inputting a processing program to the control board 80 and setting values such as cutting conditions for the control board 80 or the like to the control board 80. The external circumference of the above described zone upon the moving truck 18 is surrounded by a safety fence (not shown in the figure) so that the worker 84 should not mistakenly fall off it, and a door 86 for allowing the worker 84 to pass through is provided at a portion of this safety fence. The spot at which the door 86 is provided is a spot on the front portion of the moving truck 18 facing the table 12, and is located between the region where the light beam 30 of the horizontal beam forward warning detector 26 passes (i.e. the horizontal beam forward warning region) and the region where the wire 38 of the horizontal beam forward emergency detector 84 passes (i.e. the horizontal beam forward emergency region). Accordingly, before the worker opens the door 86 when he is getting onto the moving truck 18, and also after he has opened the door 86 when he is getting down from the moving truck 18, without fail, the worker comes to be detected by the horizontal beam forward warning detector 26.

A door open detector 88 which detects whether the door 86 is opened or closed is provided at the hinge portion of the door 86. The output signal of this door open detector 88 is also inputted to the control board 80, and therein this output signal of the door open detector 88, and above all the signal which indicates that the door 86 is opened, is used for causing the movement operation of the head moving device (i.e. the movement operation of the cutting head 24) to be paused.

Furthermore, a return to operation switch 90 is provided at the end portion of the horizontal beam 20 at the opposite end thereof from the moving truck 18. The output signal of this return to operation switch 90 is also inputted to the control board 80, and therein this output signal of the return to operation switch 90 is used for returning the movement operation of the head moving device (i.e. the movement operation of the cutting head 24) to its original normal operational state, after it has been paused by a signal from the door open detector 88, or after it has been decelerated by a signal from the above described warning detector 26 or 40.

Figure 2:
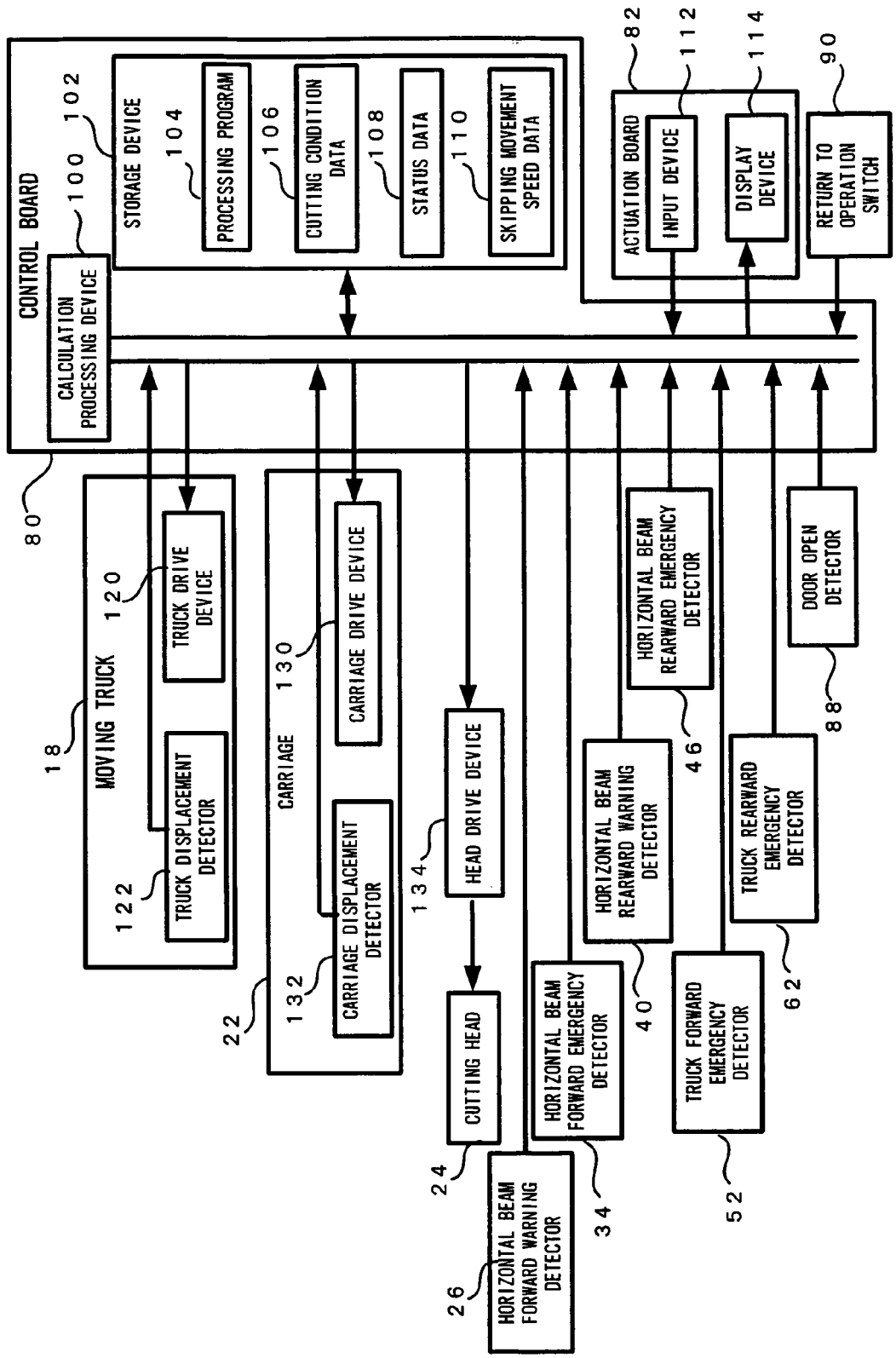
FIG. 2 is a block diagram showing the structure of a control board 80, and the connection relationships between this control board 80 and other components.

Next, the structure and the control operation of the control board 80 will be described in detail. FIG. 2 shows the structure of the control board 80, and the connection relationship between the control board 80 and other components.

As shown in FIG. 2, the control board 80 comprises a calculation processing device 100 and a storage device 102. The calculation processing device 100 performs various types of calculation processing for controlling the operation of the various sections of this cutting machine 10, and sends control signals based upon the results of its calculations to the various sections. Programs and data which are used by the calculation processing device 100, for example a processing program 104, cutting condition data 106, status data 108, skipping movement speed data 110 and the like, are stored in a storage device 102. The actuation board 82 is connected to the control board 80, and this actuation board 82 comprises an input device 112 and a display device 114. The input device 112 is a device for the worker to input to the control board 80 the above described processing program 104, cutting condition data 106, and status data 108, and also various types of operating command and the like, such as in particular a processing start command. And the display device 114 is a device for supplying a graphical user interface for the control board 80.

In the processing program 104, information is specified about the nesting and cutting lines for a plurality of manufactured products which are to be cut out from the material being processed; in other words, a processing procedure is described which specifies what is the layout of the manufactured products and according to what cutting out procedure performed along what cutting lines the cutting of these manufactured products is to be performed.

In the cutting condition data 106, data is specified for various cutting conditions which may be used, for example the thickness and the nature of various types of materials to be cut which may be employed, and the rated power of various types of cutting head 24 which may be employed (for example, in the case of a plasma torch, the rated plasma current value and the nozzle diameter, and in the case of a laser torch the rated laser beam power value), and the like. It is possible to select the desired cutting conditions from among the various cutting conditions in the cutting condition data 106 with commands from the input device 112.

In the status data 108, various cutting status data is specified corresponding to various cutting conditions which may be employed. Here, the cutting status includes various types of status which are controlled when cutting the material to be cut: for example, this may include the value of the movement speed when moving the cutting head (hereinafter this will be termed the "cutting movement speed") while cutting the material to be cut (hereinafter this movement will be termed "cutting movement"), and a plurality of items of data relating to various types of status when driving the cutting head 24 (in the case of a plasma torch, the plasma current value and the gas flow rate, in the case of a laser torch the laser beam power value, and the like). The above described cutting movement speed may be, for example from about 1 m/min to about 5 m/min.

And, in the skipping movement speed data 110, there are set component values for movement speed in the X axis direction and the Y axis direction (hereinafter this will be termed the "skipping movement speed") when moving the cutting head 24 without performing cutting (hereinafter this movement will be termed "skipping movement"). At least two types of speed component value sets are included in the component values set here for the skipping movement speed in the Y axis direction and the X axis direction: a set of speed component values in the X axis direction and the Y axis direction for the "high speed state" and a set of speed component values in the X axis direction and the Y axis direction for the "low speed state". The speed component values in the X axis direction and the Y axis direction for the "high speed state" may, for example, agree respectively with the highest movement speed values of the head moving device 25 in the X axis direction and the Y axis direction (in other words, the ultimate movement speed values of the moving truck 18 and the carriage 22). On the other hand, the speed component values in the X axis direction and the Y axis direction for the "low speed state" are lower speeds than those for the "high speed state", and are speed values at which the movement of the head moving device can be stopped substantially immediately. The skipping movement speed for the "high speed state" is a much higher speed than the above described cutting movement speed, and may be, for example, around 25 m/min to 50 m/min. On the other hand, the skipping movement speed for the "low speed state" is between the cutting speed and the skipping movement speed for the "high speed state", or is at least equal to the cutting movement speed, and may be set to, for example, 10 m/min or less.

Figure 3:
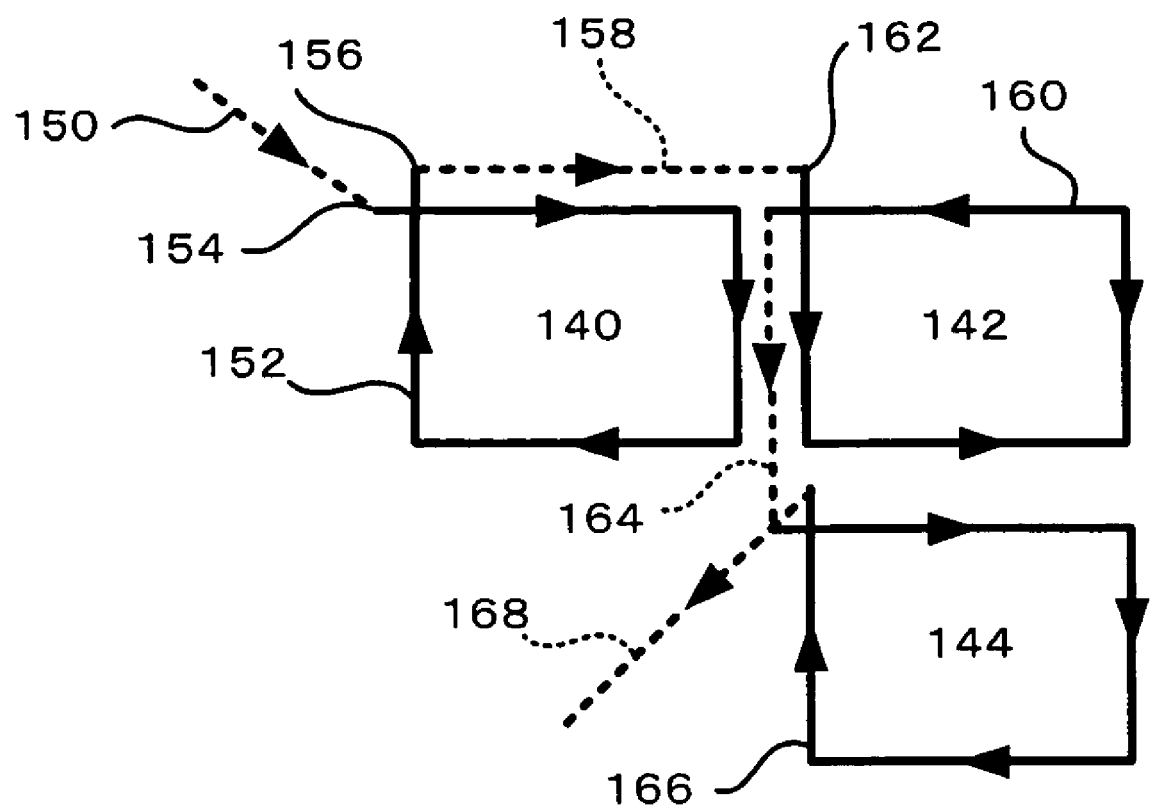
FIG. 3 is a plan view showing an example of a movement path of a cutting head 4, when a plurality of manufactured products 140, 142, and 144 are being cut out from a material to be cut.

Now, with reference to FIG. 3, the above described "cutting movement" and "skipping movement" will be additionally explained. In FIG. 3, there is shown an example of a movement path for a cutting head 4 when cutting out a plurality of manufactured products 140, 142, and 144 from a piece of material to be cut.

As shown in FIG. 3, when cutting out the first manufactured product 140, the cutting head 24 moves along a predetermined movement path 150 from a predetermined origin (not shown in the drawings), and arrives at a start point 154 for starting cutting upon a first cutting line 152. The movement at this time is skipping movement in which operation for cutting is not performed. Thereafter, the cutting head 24 is driven (i.e., is ignited), and is moved along the first cutting path 152 from its start point 154 for starting cutting to its cutting end point 156. The movement at this time is cutting movement which is accompanied by cutting operation. Thereafter, the driving of the cutting head 24 is stopped, and the cutting head is moved along a movement path 164 up to a start point 162 for starting cutting upon the next cutting path 160. The movement at this time is skipping movement. Subsequently, in a similar manner, skipping movement and cutting movement are alternatingly repeated: i.e., cutting movement along the next cutting path 160, skipping movement along the next movement path 164, then cutting movement along the next cutting path 166, and then skipping movement along the next movement path 168.

The movement speed during skipping movement, in other words the skipping movement speed, varies between the "high speed state" and the "low speed state", as described above. And the skipping movement speed in the "low speed state" is a low speed of an order in which the stopping distance is substantially zero, so that the movement can be stopped immediately. On the other hand, the cutting movement speed when moving while cutting the material to be cut is a speed which is yet lower than the skipping movement speed in the "low speed state", or at the very most is equal to it. Accordingly, the stopping distance from the cutting movement speed is substantially zero, so that it is possible to stop immediately therefrom.

Now FIG. 2 will be again referred to for a second time. The calculation processing device 100 reads in the processing program 104, data about the cutting status which corresponding to the cutting conditions which have been selected from the status data 108, and the skipping movement speed data 110. And the calculation processing device 100 controls the driving of the head moving device 25 and the cutting head 24 so as sequentially to cut out the plurality of manufactured products from the material to be cut, according to the steps commanded by the processing program 104. In this process of control, when performing the above described cutting movement, in principle, the calculation processing device 100 moves the cutting head 24 at the cutting movement speed which is set by the status data 108, while on the other hand, when performing the above described skipping movement, it moves the cutting head 24 in the X axis direction and in the Y axis direction at the components speeds in the X axis direction and the Y axis direction designated by the skipping movement speed data 110 for the "high speed state".

In addition, during this process control, the calculation processing device 100 continuously monitors the output signals of the warning detectors 26 and 40, the emergency detectors 34, 46, 52, and 62, the door open detector 88, and the return to operation switch 90. And, when a signal is input from either one of the warning detectors 26 and 40 which indicates that an obstruction has been detected in either one of the warning regions, the calculation processing device 100 changes the skipping movement speed from the one for the "high speed state" to the one for the "low speed state". However, even in this case, the cutting movement is performed in a normal manner with the predetermined cutting movement speed, in a similar manner to when performing the above described control in principle. Due to this, not only during the cutting movement but also during the skipping movement, the cutting head 24 comes to move at a safe low speed such that it can stop immediately if required. Thereafter, when a return to operation command is inputted from the return to operation switch 90, the calculation processing device 100 returns the skipping movement speed to the "high speed state", and resumes the above described control in principle.

Moreover, when a signal is inputted from the door open detector 88 which indicates that the door 86 is opened, the calculation processing device 100 pauses the movement of the cutting head 24. Thereafter, when a return to operation command is inputted from the return to operation switch 90, the calculation processing device 100 cancels the above described pausing, and resumes the above described control in principle.

Furthermore, the calculation processing device 100 decides whether or not a worker is riding upon the moving truck 18, based upon the signals from the horizontal beam forward warning detector 26 and the door open detector 88. If it is decided that a worker is indeed riding upon the moving truck 18, then, except for the case described above in which the door 86 is opened, in a similar manner to the case when detection has been performed by the warning detectors 26 and 40, the calculation processing device 100 limits the skipping movement speed to that for the "low speed state", and moves the cutting head 24 at a safe low speed, not only during the cutting movement, but also during the skipping movement.

And thereafter, when the worker gets down from the moving truck 18 and inputs a return to operation command from the return to operation switch 90, the calculation processing device 100 returns the skipping movement speed to that for the "high speed state", and resumes the above described control in principle.

Yet further, when a signal is inputted from any one of the emergency detectors 34, 46, 52, and 62 which indicates that an obstruction has been detected in any one of the emergency regions, then the calculation processing device 100 forcibly stops performing control according to the processing program. Due to this, the movement of the cutting head 24 is immediately forcibly stopped, whichever of cutting movement or skipping movement may have been being performed. In this case, even if a return to operation command is thereafter inputted from the return to operation switch 90, the calculation processing device 100 does not respond. Unless the worker actuates the actuation board 82 and inputs a predetermined command, the calculation processing device 100 will not resume control according to the processing program.

Due to this type of movement control, if a worker who is performing some task upon the table 12 comes close to the cutting head 24 or the horizontal beam 20, first, when this worker intrudes upon the horizontal beam forward warning region or rearward warning region (i.e., in FIG. 1, the light beam 30 or the light beam 44) which are somewhat separated from the cutting head 24 or the horizontal beam 20, then this worker is detected, and the movement speed of the cutting head 24 and the horizontal beam 20 is reduced to a safe speed at which it is possible to stop at any time. However, since the cutting of the material to be processed by the cutting head 24 is continued, accordingly no obstacle is raised to this cutting process. Furthermore, since the detection of the worker is performed by a non contact type method, accordingly no interference whatever is imparted to the worker. Thereafter, if the worker gets yet closer and touches the horizontal beam forward emergency region or rearward emergency region (in FIG. 1, the wire 38 or the bar 50), then this worker is detected for a second time, and the movement of the cutting head 24 and the horizontal beam 20 is stopped on an emergency basis. Since the movement speed of the cutting head 24 and the horizontal beam 20 have already been reduced down to a safe speed, accordingly the cutting head 24 and the horizontal beam 20 are immediately stopped (in other words, their stopping distance is substantially zero), and thus the safety of the worker is ensured. Moreover, since the detection of the worker is performed by a contact type method, it is possible to make the worker aware of the imminent danger.

Furthermore, if a worker who is present outside the table 12 approaches the moving truck 18, when this worker comes into contact with the truck forward emergency region or rearward emergency region (in FIG. 1, the bar 58 or the bar 70), then this worker is detected, and the movement of the cutting head 24 and the horizontal beam 20 is stopped on an emergency basis. Since, when the worker is detected, a gap is present between the worker and the moving truck 18 which is greater than or equal to the stopping distance, accordingly it is possible to stop the moving truck 18 safely. Moreover, since the detection of the worker is performed by a contact type method, it is possible to make the worker aware of the imminent danger.

Now, in order to control the movement of the cutting head 24 in the above described manner, the calculation processing device 100 outputs a X axis direction speed command to the moving truck 18, and outputs a Y axis direction speed command to the carriage 22. In the moving truck 18, a truck drive device 120 moves the moving truck 18 in the X axis direction at a speed according to this X axis direction speed command. And a truck displacement detector 122 detects the displacement of the moving truck 18 in the X axis direction. The calculation processing device 100 feeds back the detection signal of the truck displacement detector 122, calculates the position of the cutting head 24 in the X axis direction based thereupon, and controls the position of the cutting head 24 in the X axis direction based thereupon. Moreover, in the carriage 22, a carriage drive device 130 moves the carriage 22 in the Y axis direction at a speed according to this Y axis direction speed command. And a carriage displacement detector 132 detects the displacement of the carriage 22 in the Y axis direction. The calculation processing device 100 feeds back the detection signal of the carriage displacement detector 132, calculates the position of the cutting head 24 in the Y axis direction based thereupon, and controls the position of the cutting head 24 in the Y axis direction based thereupon.

Furthermore, the calculation processing device 100 outputs a head output control command to a head drive device 134 (for example, in the case of a plasma cutting machine, to a plasma power supply device and to a gas supply valve, and in the case of a laser cutting machine to a laser oscillation device). And this head drive device 134 drives the cutting head 24 according to the head output control command.

In the following, the details of the control which is performed by the above described calculation processing device 100 will be explained with reference to FIGS. 4 through 8.

Figure 4:
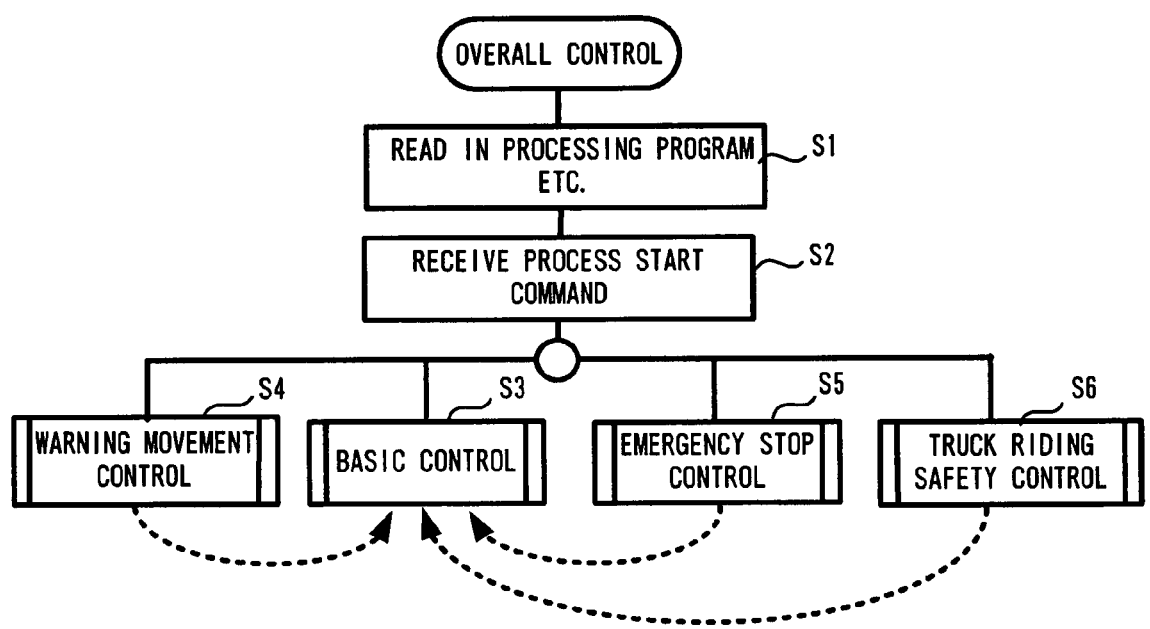
FIG. 4 is a flow chart for the overall control performed by a calculation processing device 100.

FIG. 4 shows the flow of overall control.

As shown in FIG. 4, the calculation processing device 100 reads in the processing program 104 (a step S1). And, upon receipt of a processing start command from the actuation board 82 (a step S2), the calculation processing device 100 starts executing basic control (a step S3), warning movement control (a step S4), emergency stop control (a step S5), and truck riding safety control (a step S6). Here, in the basic control (the step S3), fundamental control operation of the head moving device 25 and the cutting head 24 is performed in order to cut the material to be cut faithfully according to the processing program 104. In the warning movement control (the step S4), control operation is performed in order to reduce the skipping movement speed due to the basic control when an obstruction has been detected in any one of the warning regions described above. In the emergency stop control (the step S5), control operation is performed in order to forcibly terminate the execution of the processing program for basic control, and to stop the operation of the head moving device 25 and the cutting head 24 on an emergency basis, when an obstruction has been detected in any one of the emergency regions described above. And, in the truck riding safety control (the step S6), control is performed in order to limit the skipping movement speed due to the basic control when a worker is riding upon the moving truck 18, and in order to pause the operation control of the head moving device 25 according to the basic control, when the door 86 is opened.

Figure 5:
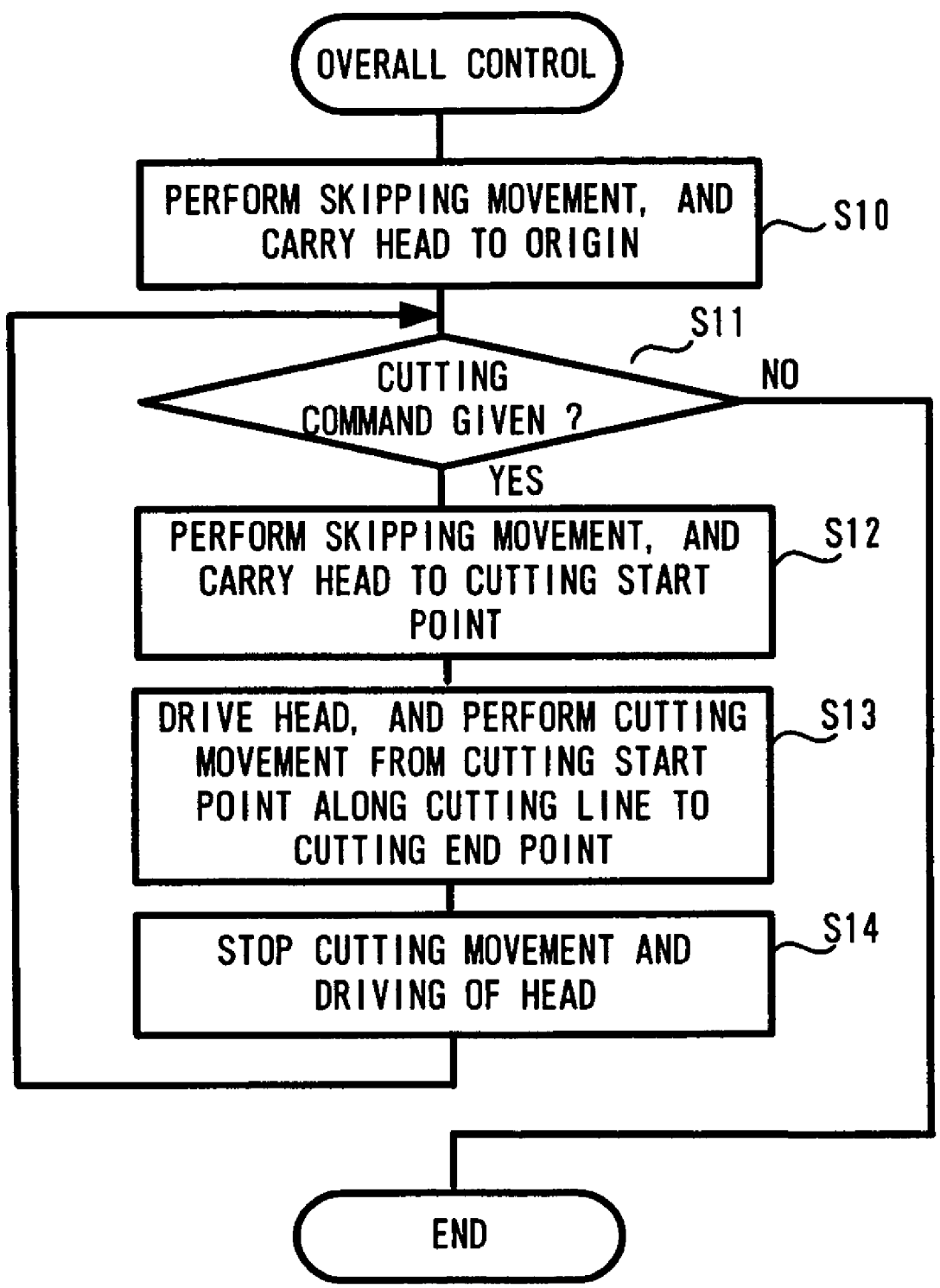
FIG. 5 is a flow chart for basic control (S3)

FIG. 5 shows the flow of basic control (S3).

As shown in FIG. 5, skipping movement of the cutting head 24 is performed, and the cutting head 24 is carried over the table 12 to the predetermined origin (a step S10). Thereafter, when a cutting command is read for a first cutting path which is described in the processing program 104 (YES in the step S11), skipping movement of the cutting head 24 is performed, the cutting head 24 is carried to the cutting start position for this cutting path (a step S12). Thereafter, the cutting head is driven (i.e. is ignited), and cutting movement of the cutting head 24 is performed from this cutting start position along this cutting path to the cutting end position (a step S13). Thereafter, along with the cutting movement being stopped, the driving of the cutting head is stopped (i.e. it is turned out) (a step S14). And, thereafter, the above described steps S11 through S14 are executed for the next cutting path which is described in the processing program 104. After the above described steps S11 through S14 have been repeated for all of the cutting paths described in the processing program 104, this basic control terminates.

Figure 6:
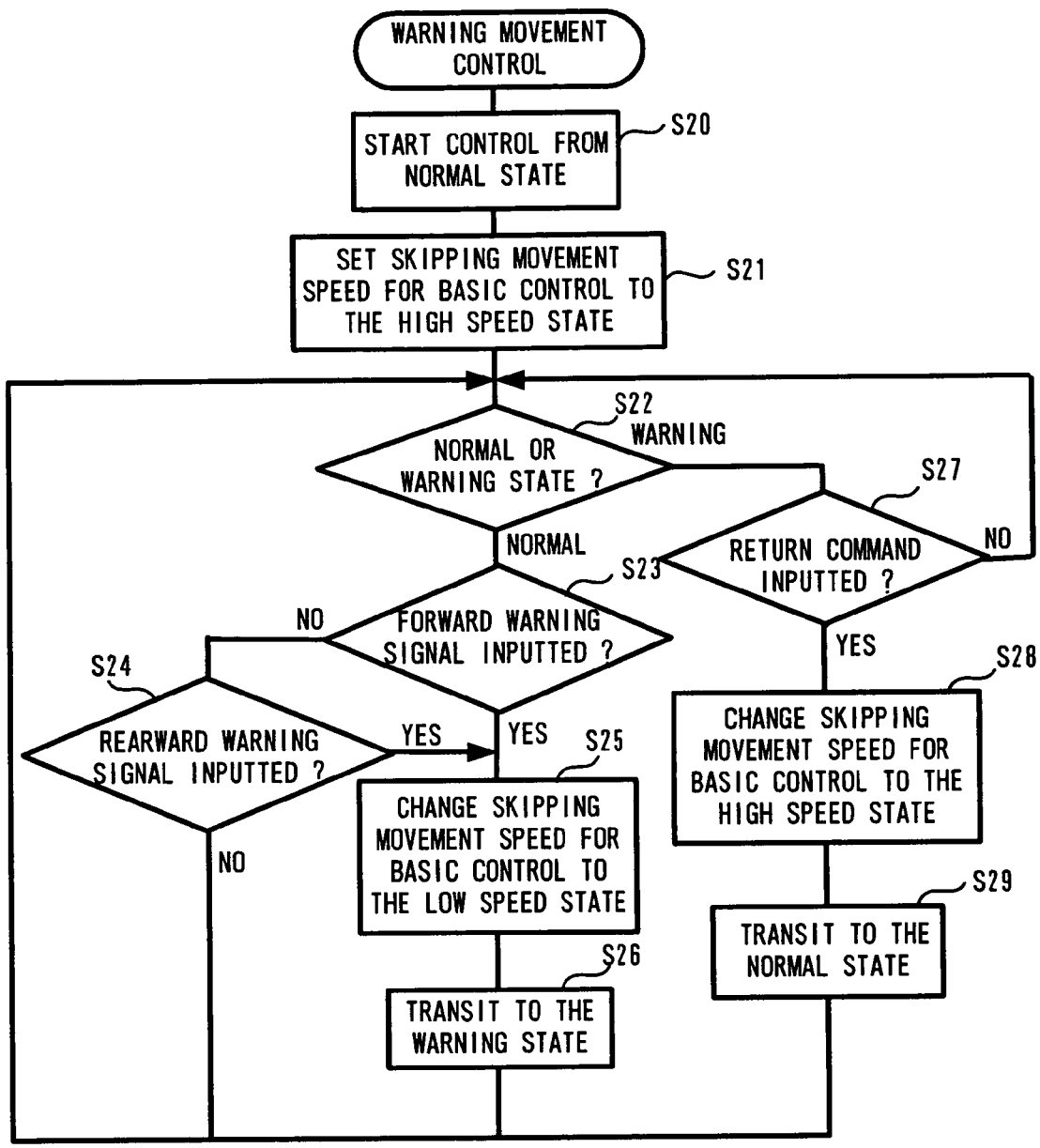
FIG. 6 is a flow chart for warning movement control (S4)

FIG. 6 shows the flow of warning movement control (S4).

The warning movement control selectively takes one of two states: "normal state" and "warning state". As shown in FIG. 6, first the warning movement control is started from the normal state (a step S20). In the normal state, the components in the X axis direction and the Y axis direction of the skipping movement speed for normal control are set to the component speed values for the "high speed state" as designated by the skipping movement speed data 110 (refer to FIG. 2) (a step S21). Accordingly, the skipping movement of the cutting head 24 comes to be performed at a speed which is much greater than the speed of the cutting movement.

When the warning movement control is in the normal state ("normal" in a step S22), if a signal is inputted from the horizontal beam forward warning detector 26 or rearward warning detector 40 which indicates that an obstruction has been detected (hereinafter this will be referred to as the "forward warning signal" or the "rearward warning signal") (in other words, if an obstruction enters into the horizontal beam forward warning region or rearward warning region) (YES in a step S23 or S24), then the components in the X axis direction and the Y axis direction of the skipping movement speed for normal control are changed to the component speed values for the "low speed state" as designated by the skipping movement speed data 110 (refer to FIG. 2) (a step S25), and the state of the warning movement control transits to the warning state (a step S26). No change is made to the cutting movement speed.

When temporarily the warning movement control transits to the warning state ("warning" in the step S22), then, provided that no return to operation command is inputted from the return to operation switch 90 (NO in the step S27), the warning state is continued even if input of the above described forward or rearward warning signal is not present (in other words, even if the obstruction is removed from the horizontal beam forward warning region or rearward warning region). Due to this, the head moving device 25 and the cutting head 24 move at a safe low speed at which it is possible for them to stop immediately at any time, not only during the cutting movement, but during the skipping movement as well.

When the warning movement control is in the warning state ("warning" in the step S22), when a return to operation command is inputted from the return to operation switch 90 (YES in the step S27), the skipping movement speed is returned to the "high speed state" for a second time (a step S28), and the control state is returned to the normal state (a step S29).

Figure 7:
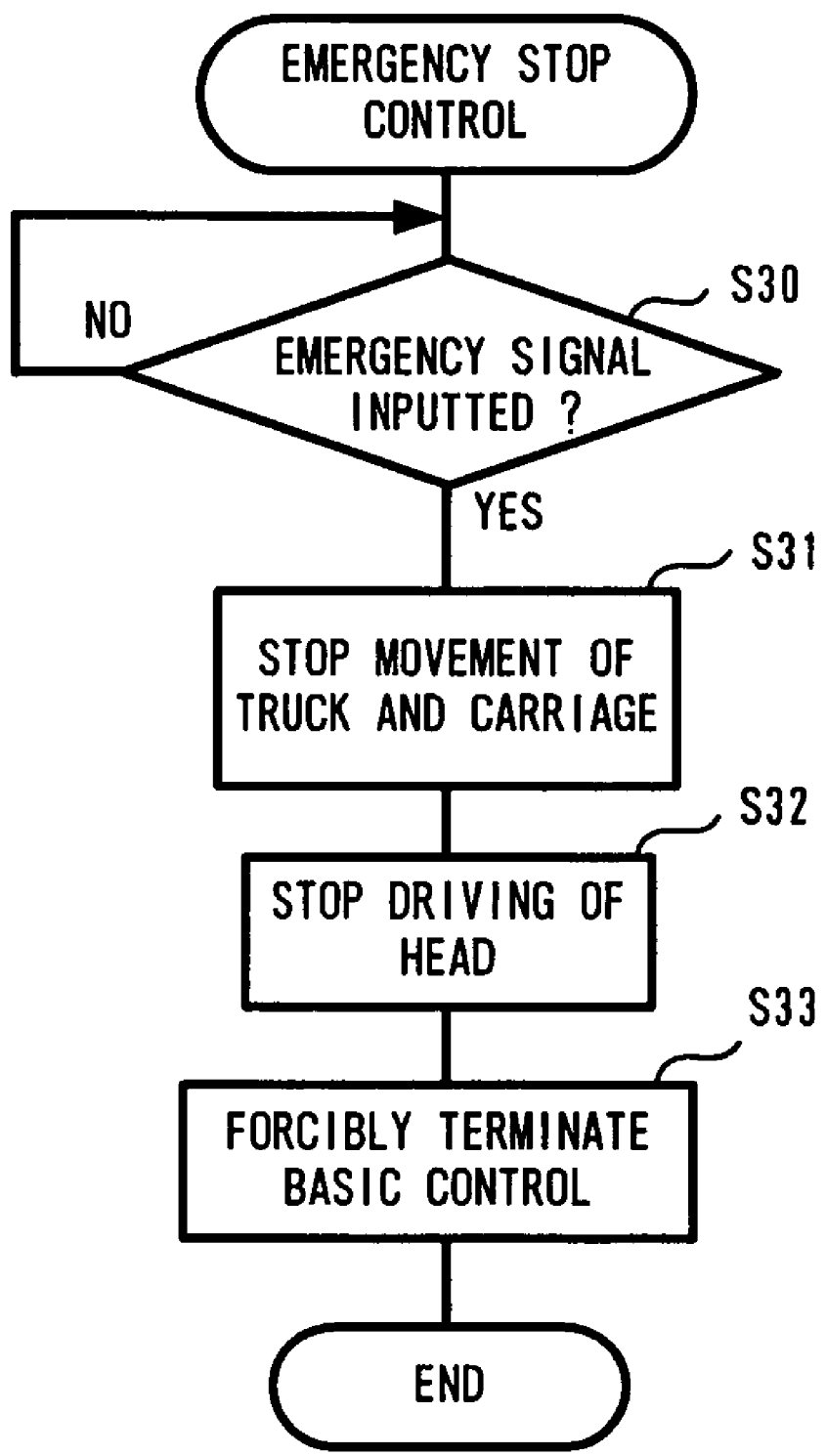
FIG. 7 is a flow chart for emergency stop control (S5)

FIG. 7 shows the flow of emergency stop control (S5).

As shown in FIG. 7, when a signal is inputted from any one of the emergency detectors 34, 46, 52, or 62 to the effect that an obstruction has been detected (hereinafter this will be termed an "emergency signal") (in other words, if an obstruction has intruded upon any one of the emergency regions) (YES in a step S30), then the operation of the head moving device 25, in other words the movement of the cutting head 24, is forcibly stopped (a step S31), the driving of the cutting head 24 is forcibly stopped (a step S32), and the basic control according to the processing program is forcibly terminated (a step S33). Subsequently, provided that a worker does not input a predetermined command from the actuation board 82, the basic control is not resumed even if the input of the emergency signal ceases (in other words, even if the obstruction is removed from the emergency region), and even if a return to operation command is inputted.

Figure 8:
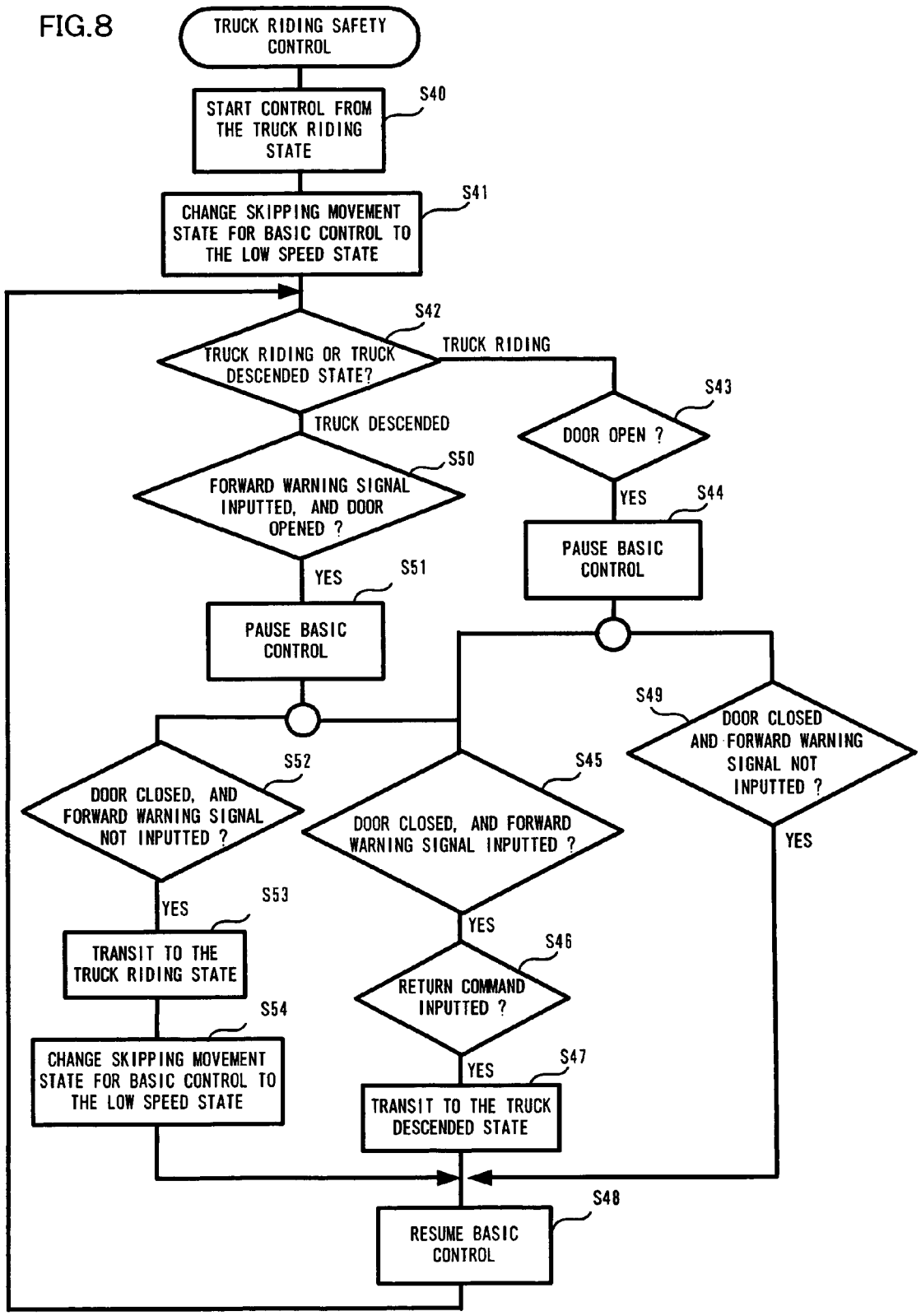
FIG. 8 is a flow chart for truck riding safety control (S6).

FIG. 8 shows the flow for truck riding safety control (S6).

The truck riding safety control selectively takes one of two states: "truck riding state" and "truck descended state". As shown in FIG. 8, first the truck riding safety control is started in the truck riding state (a step S40). As shown in FIG. 4, this is because the basic control (the step S3), the warning movement control (the step S4), the emergency stop control (the step S5), and the truck riding safety control (the step S6) are started by a processing start command being inputted by a worker in the state in which he is riding upon the moving truck 18 (S2 of FIG. 4). In the truck riding state, the components in the X axis direction and the Y axis direction of the skipping movement speed for the basic control are set (a step S41) to the component speed values for the "low speed state" which are specified by the skipping movement speed data 110 (refer to FIG. 2). No change is made to the cutting movement speed. Accordingly, in the truck riding state, the head moving device 25 and the cutting head 24 move at a safe low speed at which it is possible to stop immediately at any time, not only during the cutting movement but also during the skipping movement.

When the truck riding safety control is in the truck riding state ("truck riding" in a step S42), if it is detected by the door open detector 88 that the door 86 is opened (YES in a step S43), the basic control is paused (a step S44). This pausing of the basic control is only stopping and waiting the progression of control of the head moving device 25 and the cutting head 24 according to the processing program at the current stage, and the basic control can subsequently be resumed from the current stage, which is different from the termination of the basic control in the step S33 of FIG. 7. By this pausing of the basic control, the movement of the head moving device 25 and the cutting head 24 is paused at this position.

If the basic control has been paused in the step S44 in this manner (the step S44), when thereafter it is detected by the door open detector 88 that the door 86 has closed and moreover within a predetermined short time point from this detection time point a forward warning signal is inputted (YES in a step S45), then this means that the worker has descended from the moving truck 18. For this reason, when thereafter a return to operation command is inputted from the return to operation switch 90 (a step S46), the state of the truck riding safety control transits to the truck descended state (a step S47), the pausing of the basic control is cancelled, and the basic control is resumed from the current state (a step S48). When the basic control has been resumed by a return to operation command in this manner, as has already been explained in the step S28 of FIG. 6, the skipping movement speed comes to be returned to the "high speed state".

Furthermore, when the basic control has been paused in the step S44 as described above, if thereafter, although it has been detected by the door open detector 88 that the door 86 has been closed, still no forward warning signal has been inputted within a predetermined short time period from this detection time point (YES in a step S49), then this means that the worker has closed for a second time the door 86 which he temporarily opened, while still continuing in the state in which he is riding upon the moving truck 18. For this reason, in this case, the state of the truck riding safety control is kept in the truck riding state just as it is (in other words, the skipping movement speed is maintained in the "low speed state"), and the pausing of the basic control is cancelled and the basic control is resumed (a step S48).

After the state of the truck riding safety control has transited to the truck descended state ("truck descended" in the step S42), if a forward warning signal is inputted and moreover within a predetermined short time period from this input time point it is detected by the door open detector 88 than the door 86 has been opened (YES in a step S50), then this means that a worker has approached the moving truck 18 from upon the table 12 and has opened the door 86. For this reason, in this case, first, the basic control is paused, and the movement of the head moving device 25 and the cutting head 24 is paused at this position (a step S51). Thereafter if, although it has been detected by the door open detector 88 that the door 86 has been closed, no forward warning signal has been inputted within a predetermined short time period from this detection time point (YES in a step S52), then this means that the worker is riding upon the moving truck 18 and has closed the door 86. For this reason, in this case, the state of the truck riding safety control transits to the truck riding state (a step S53), the skipping movement speed in the basic control is changed to the "low speed state" (a step S54), and the pausing of the basic control is cancelled and it is resumed (the step S48). It should be understood that, in this case, since the skipping movement speed was already changed in the step S25 of FIG. 6 to the "low speed state" at the stage that the forward warning signal was inputted, accordingly it would also be acceptable to omit the step S54.

On the other hand, after the basic control has been paused in the step S51, if it is detected by the door open detector 88 that the door 86 has been closed and moreover a forward warning signal is inputted within a predetermined short time period from this detection time point (YES in the step S45), then this means that, after the worker has opened the door 86, he closed the door 86 for a second time and backed away without getting onto the moving truck 18 to ride it. For this reason, when thereafter a return to operation command is inputted from the return to operation switch 90 (the step S46), the state of the truck riding safety control is kept at the truck descended state (the step S47), and the pausing of the basic control is cancelled and the basic control is resumed (the step S48). In this case, the skipping movement speed is kept at the "high speed state" without alteration.

According to the cutting machine 10 explained above which is an embodiment of the present invention, when a worker is riding upon the table 12 and is performing some task, if a worker approaches the head moving device 25 (the horizontal beam 20 or the cutting head 24 or the like), first, when the gap between the head moving device 25 and the worker is still greater than or equal to the stopping distance, the worker is detected in a non contact type manner, and the speed of the skipping movement of the head moving device 25 is reduced to a safe speed at which it is possible to stop immediately. At this time, the cutting task continues normally. Thereafter, if the gap between the worker and the head moving device 25 narrows further, the worker is detected in a contact type manner, and the head moving device 25 is stopped on an emergency basis. Due to this two stage type movement control, the frequency at which interruption of the cutting task due to emergency stoppage takes place is reduced, and moreover the security of the worker is enhanced. Furthermore, by decreasing the frequency of emergency stoppage, the amount of imposition of large stresses upon the head moving device 25 during emergency stopping is reduced, and accordingly the life of the head movement device 25 is extended.

Furthermore, by the skipping movement speed being reduced to the "low speed state" due to the warning movement control before emergency stoppage is reached, it becomes possible to set the "high speed state" skipping movement speed during the normal state to a higher speed that that for a prior art type cutting machine which is not endowed with this function of warning movement control (i.e. one which only has an emergency stop function). In other words, with an emergency stop function only, from the point of view of ensuring security, the upper limit of the skipping movement speed is around, for example, 15 m/min to 25 m/min. On the other hand, with the cutting machine 10 according to the embodiment described above, by setting the skipping movement speed in the "low speed state" to, for example, less than or equal to 10 m/min, it is possible, while still maintaining security, to increase the upper limit of the skipping movement speed in the "high speed state" to a high speed of around double that, for example up to around 25 m/min to 50 m/min. If it is possible to increase the skipping movement speed to a higher speed in this manner while still ensuring security, the proportion of the processing time which is occupied by the skipping movement is reduced, so that the productivity is enhanced. For example, with a cutting machine according to the prior art, it is not unusual for the skipping movement to occupy around 30% of the entire processing time period for a single cycle. In this type of case, if the skipping movement speed is increased by around twice as described above, then, speaking roughly, the processing time period is reduced by around 15%; in other words, the productivity comes to be enhanced by around 15%.

Moreover even if a worker approaches the moving truck 18 while he is present exterior to the table 12, while the gap between the worker and the moving truck 18 is still greater than or equal to the stopping distance, the worker is detected in a contact type manner, and the moving truck 18 is stopped on an emergency basis. Due to this, the security of the worker is enhanced.

Yet further, when the working is riding upon the moving truck 18, the moving truck 18 is moved at a lower speed than when no worker is riding thereupon. Due to this, the security of the worker is enhanced.

Although the present invention has been explained above in terms of an embodiment thereof, this embodiment is only shown as an example in order to explain the present invention; the range of the present invention is not to be considered as being limited to this embodiment only. Provided that the gist of the present invention is not departed from, it may be implemented in various other manners.

For example, in the truck riding safety control shown in FIG. 8, it is not necessary for the skipping movement speed in the "low speed state" while a worker is riding upon the moving truck 18, and the skipping movement state in the "low speed state" when, during the warning movement control shown in FIG. 6, a worker has entered any one of the warning regions, to be the same; these may be different speeds to match their individual objectives. Furthermore, in the case of a cutting machine of a type in which riding the moving truck 18 is not possible, it is a matter of course that the truck riding safety control is not required.

Moreover, in the truck riding safety control shown in FIG. 8, as the method for deciding whether or no a worker is riding upon the truck, it would also be acceptable to employ some method whose reliability is higher, such as, for example, a method which uses a pressure sensor installed in the floor of the riding zone of the moving truck 18, or the like.

Furthermore, it would also be acceptable to arrange to implement the movement control in two stages, using a warning region and an emergency region, not only for the horizontal beam 20 over the table 12, but also for the moving truck 18 as well.

Yet further, for the various types of detector, it would be possible to employ ones which operate in various other ways.

The invention claimed is:
1. A cutting machine, comprising:
a table upon which a material to be processed is mounted;
a cutting head which cuts said material to be processed upon said table;
a head moving device which supports said cutting head, which moves in the lengthwise direction and the widthwise direction of said table, and which moves said cutting head with respect to said material to be processed upon said table;
a control device which controls said head moving device; and
a warning detector which detects whether any obstruction is present in a predetermined warning region which is arranged so as to be separated by a predetermined distance range from a portion of said head moving device which is present over said table, and from said cutting head; and
an emergency detector which detects whether any obstruction is present in a predetermined emergency region which is arranged so as to be closer to the portion of said head moving device which is present over said table, and to said cutting head, than said warning region;
wherein said control device comprises:
a basic control means which, when moving said cutting head while cutting said material to be processed, controls a movement speed of said cutting head to a predetermined cutting movement speed; and when moving said cutting head while not cutting said material to be processed, controls the movement speed of said cutting head to a predetermined skipping movement speed; and
a warning movement control means which, when moving said cutting head while not cutting said material to be processed, in response to said warning detector, reduces said skipping movement speed while not stopping the movement of said cutting head; and
an emergency stop control means which forcibly stops the movement of said cutting head in response to said emergency detector;
wherein said head moving device comprises:
a horizontal beam which extends along said widthwise direction over said table and straddles over said table; and a carriage which is mounted to said horizontal beam, which moves upon said horizontal beam in said widthwise direction, and which supports said cutting head; wherein said warning detector comprises:
a horizontal beam forward warning detector which detects whether an obstruction is present in a horizontal beam forward warning region which is arranged as separated from said horizontal beam by a predetermined distance range forward from said horizontal beam in said lengthwise direction, and which moreover extends along almost the total length of said horizontal beam in said widthwise direction; and
a horizontal beam rearward warning detector which detects whether an obstruction is present in a horizontal beam rearward warning region which is arranged as separated from said horizontal beam by a predetermined distance range rearward from said horizontal beam in said lengthwise direction, and which moreover extends along almost the total length of said horizontal beam in said widthwise direction; and
wherein said emergency detector comprises:

a horizontal beam forward emergency detector which detects whether an obstruction is present in a horizontal beam forward emergency region which is arranged forward from said horizontal beam in said lengthwise direction and closer to said horizontal beam than said horizontal beam forward warning region, and which moreover extends along almost the total length of said horizontal beam in said widthwise direction; and a horizontal beam rearward emergency detector which detects whether an obstruction is present in a horizontal beam rearward emergency region which is arranged rearward from said horizontal beam in said lengthwise direction and closer to said horizontal beam than said horizontal beam rearward warning region, and which moreover extends along almost the total length of said horizontal beam in said widthwise direction.

2. The cutting machine according to claim 1, wherein said warning detector comprises a non contact type sensor and detects said obstruction without contacting said obstruction.

3. The cutting machine according to claim 1, wherein said emergency detector comprises a contact type sensor and detects said obstruction by contacting said obstruction.

4. The cutting machine according to claim 1, characterized in that a gap between said warning region and said emergency region is a distance greater than or equal to a stopping distance which is required to stop said cutting head when said cutting head is moving at the skipping movement speed without yet having decelerated.

5. The cutting machine according to claim 1, characterized in that:
said head moving device comprises a truck which moves outside said table in said lengthwise direction, and
said emergency detector comprises:
a truck forward emergency detector which detects whether an obstruction is present in a truck forward emergency region which is arranged forward from said truck in said lengthwise direction, and which moreover extends along almost the total width of said truck in said widthwise direction; and
a truck rearward emergency detector which detects whether an obstruction is present in a truck rearward emergency region which is arranged rearward from said truck in said lengthwise direction, and which moreover extends along almost the total width of said truck in said widthwise direction.

6. The cutting machine according to claim 5, characterized in that said truck forward emergency region and said truck rearward emergency region are arranged, to forward and rearward from said truck in said lengthwise direction respectively, as separated by gaps greater than or equal to said stopping distance.

7. A cutting machine, comprising:
a table upon which a material to be processed is mounted;
a cutting head which cuts said material to be processed upon said table;
a head moving device which supports said cutting head, which moves in the lengthwise direction and the widthwise direction of said table, and which moves said cutting head with respect to said material to be processed upon said table;
a control device which controls said head moving device; and
a warning detector which detects whether any obstruction is present in a predetermined warning region which is arranged so as to be separated by a predetermined distance range from a portion of said head moving device which is present over said table, and from said cutting head; and
an emergency detector which detects whether any obstruction is present in a predetermined emergency region which is arranged so as to be closer to the portion of said head moving device which is present over said table, and to said cutting head, than said warning region;
wherein said control device comprises:
a basic control means which, when moving said cutting head while cutting said material to be processed, controls a movement speed of said cutting head to a predetermined cutting movement speed; and when moving said cutting head while not cutting said material to be processed, controls the movement speed of said cutting head to a predetermined skipping movement speed; and
a warning movement control means which, when moving said cutting head while not cutting said material to be processed, in response to said warning detector, reduces said skipping movement speed while not stopping the movement of said cutting head; and
an emergency stop control means which forcibly stops the movement of said cutting head in response to said emergency detector;
wherein said head moving device comprises a truck which moves outside said table in said lengthwise direction, and
wherein said emergency detector comprises:
a truck forward emergency detector which detects whether an obstruction is present in a truck forward emergency region which is arranged forward from said truck in said lengthwise direction, and which moreover extends along almost the total width of said truck in said widthwise direction; and
a truck rearward emergency detector which detects whether an obstruction is present in a truck rearward emergency region which is arranged rearward from said truck in said lengthwise direction, and which moreover extends along almost the total width of said truck in said widthwise direction.

8. The cutting machine according to claim 7, characterized in that said truck forward emergency region and said truck rearward emergency region are arranged, to forward and rearward from said truck in said lengthwise direction respectively, as separated by gaps greater than or equal to said stopping distance.

9. The cutting machine according to claim 7, wherein said warning detector comprises a non contact type sensor and detects said obstruction without contacting said obstruction.

10. The cutting machine according to claim 7, wherein said emergency detector comprises a contact type sensor and detects said obstruction by contacting said obstruction.

11. The cutting machine according to claim 7, characterized in that a gap between said warning region and said emergency region is a distance greater than or equal to a stopping distance which is required to stop said cutting head when said cutting head is moving at the skipping movement speed without yet having decelerated.

12. A cutting machine, comprising:
a table upon which a material to be processed is mounted;
a cutting head which cuts said material to be processed upon said table;
a head moving device which supports said cutting head, which moves in the lengthwise direction and the widthwise direction of said table, and which moves said cutting head with respect to said material to be processed upon said table;

a control device which controls said head moving device; and a warning detector which detects whether any obstruction is present in a predetermined warning region which is arranged so as to be separated by a predetermined distance range from a portion of said head moving device which is present over said table, and from said cutting head;

wherein said control device comprises:

a basic control means which, when moving said cutting head while cutting said material to be processed, controls a movement speed of said cutting head to a predetermined cutting movement speed; and when moving said cutting head while not cutting said material to be processed, controls the movement speed of said cutting head to a predetermined skipping movement speed;

a warning movement control means which, when moving said cutting head while not cutting said material to be processed, in response to said warning detector, reduces said skipping movement speed while not stopping the movement of said cutting head; and a riding safety control means which decides whether or not the worker is riding upon said head moving device, and, if it has decided that the worker is riding upon said head moving device, limits said skipping movement speed to a lower speed than when no worker is riding upon said head moving device; and wherein said head moving device comprises a portion for a worker to ride upon.

13. The cutting machine according to claim 12, wherein said warning detector comprises a non contact type sensor and detects said obstruction without contacting said obstruction.

14. The cutting machine according to claim 12 further comprising an emergency detector which detects whether any obstruction is present in a predetermined emergency region which is arranged so as to be closer to the portion of said head moving device which is present over said table, and to said cutting head, than said warning region, wherein said control device further comprises an emergency stop control means which forcibly stops the movement of said cutting head in response to said emergency detector.

15. The cutting machine according to claim 14, wherein said emergency detector comprises a contact type sensor and detects said obstruction by contacting said obstruction.

16. The cutting machine according to claim 14, characterized in that a gap between said warning region and said emergency region is a distance greater than or equal to a stopping distance which is required to stop said cutting head when said cutting head is moving at the skipping movement speed without yet having decelerated.

* * * * *